United States Patent [19]

Chen

[11] Patent Number: 5,107,692

[45] Date of Patent: Apr. 28, 1992

[54] AUTOMOBILE STEERING WHEEL LOCK

[75] Inventor: Shih-Yu Chen, Tainan, Taiwan

[73] Assignee: All Ship Enterprise Co., Ltd., Tainan, Taiwan

[21] Appl. No.: 751,104

[22] Filed: Aug. 28, 1991

[51] Int. Cl.⁵ .................................... B60R 25/02
[52] U.S. Cl. ........................... 70/209; 70/226; 70/379 R
[58] Field of Search ............ 70/360, 369, 380, 379 A, 70/209, 211, 212, 237, 238, 225, 226

[56] References Cited

U.S. PATENT DOCUMENTS

| | | | |
|---|---|---|---|
| 1,529,071 | 3/1925 | Leach | 70/370 |
| 2,008,662 | 7/1935 | Bechert | 70/369 |
| 4,738,127 | 4/1988 | Johnson | 70/209 |
| 4,887,443 | 12/1989 | Wang | 70/209 |
| 4,970,884 | 11/1990 | Solow | 70/209 |
| 5,031,428 | 7/1991 | Jan et al. | 70/209 |
| 5,042,278 | 8/1991 | Wang | 70/209 |
| 5,052,201 | 10/1991 | Liou | 70/209 |
| 5,062,282 | 11/1991 | Rong | 70/238 |
| 5,069,048 | 12/1991 | Lo | 70/209 |

FOREIGN PATENT DOCUMENTS

| | | | |
|---|---|---|---|
| 2081365 | 2/1982 | United Kingdom | 70/360 |
| 2182706 | 5/1987 | United Kingdom | 70/379 R |

*Primary Examiner*—Renee S. Luebke
*Assistant Examiner*—Darnell M. Boucher

*Attorney, Agent, or Firm*—Morton J. Rosenberg; David I. Klein

[57] ABSTRACT

An automobile steering wheel lock consists of an elongated tube member, a housing, an elongated rod member and a lock mechanism. The improvement of the automobile steering wheel lock is in the lock mechanism which is inserted in a lower chamber of the housing. The lock mechanism is combined by a locking member, a sleeve, a bearing member and an actuator. The sleeve defining a hollow cylinder has a bottom groove mounted by a projection of the locking member. The bearing member having a bottom cylindrical projection retained by a powerful spring is capable of passing through the sleeve and being inserted in a central circular groove of the projection of the locking member. A plurality of lugs disposed on the external wall of the actuator and corresponding to a plurality of race ways in the internal wall of the sleeve are capable of being moved by following the curvy ways of the plurality of race ways when the actuator is pushed up or drawn down, by which the bearing member controlled by the actuator and the powerful spring will protrude into or be withdrawn from one of a plurality of annular grooves of the elongated rod member so as to lock or unlock the automobile steering wheel lock. Moreover, a locating member combined by a set pin and a spring and disposed in a pin hole of the rear portion of the elongated rod member may prevent the elongated rod member from being completely drawn out of the elongated tube member.

2 Claims, 4 Drawing Sheets

AUTOMOBILE STEERING WHEEL LOCK

BACKGROUND OF THE INVENTION

1. Field of the Invention

The present invention relates to an automobile antitheft device. More particularly the present invention is directed to a device for attachment to an automobile steering wheel to prevent complete rotation thereof, and thereby securing the automobile against unauthorized use.

2. Description of the Prior Art

Antitheft devices which attach to an automobile steering wheel are known, such as that shown in U.S. Pat. No. 4,738,127 to Johnson. Such antitheft devices for attachment to a steering wheel of an automobile include an elongated body member having a passage extending therethrough. An elongated rod member is adapted to move in telescopic fashion within the passageway of the body member and opposed hooks are provided for engaging the inside portion of the steering wheel. A lock assembly is associated with the body member, engaging the elongated rod within the passage for locking the rod member in a stationary position with respect to the body member, at any of a plurality of positions. However, a problem with such a device is that it presents pry points wherein a rigid pin or arcuate ruler-like thin object can be inserted through a gap formed between the passageway and periphery of the rod member. The pin is inserted to reach a spherical bearing of the lock assembly and displace it by overcoming the bias force of a spring member, thereby releasing it from engagement with the rod member and defeating the lock.

SUMMARY OF THE INVENTION

A primary object of the present invention is to provide a locking mechanism which can directly control the upward or downward movements of a bearing member so as to allow the bearing member to protrude into or be withdrawn from an elongated rod member.

An object of the present invention is to provide a locating member inserted in a pin hole of a rear portion of the elongated rod member to prevent the elongated rod member from being completely drawn out of an elongated tube.

According to the preferred embodiment of the present invention having the objects, there are some apparent advantages described as follows:

1. The locking mechanism of the present invention which can directly control the upward or the downward movements of the bearing member to lock or unlock the automobile steering wheel lock is more improved than prior arts whose elongated rod members are indirectly actuated by locks.

2. The lock mechanism of the present invention with simple members can be easily assembled and be inserted into a housing of the lock mechanism so as to save producing cost.

3. The lock mechanism of the present invention is also adapted to be used with different housings or lock seats for multiple purposes.

4. A housing of the lock mechanism of the present invention can be monoblock-casted with the elongated tube.

5. The locating member of the present invention with a spring and a set pin in the pin hole of the rear portion of the elongated rod member can be easily inserted into a central passageway of the elongated tube so as to save producing cost.

6. The locating member of the present invention can prevent the elongated rod member from being completely drawn out of the elongated tube.

BRIEF DESCRIPTION OF THE DRAWINGS

The invention will be better understood by reference to the accompany drawings, wherein.

DESCRIPTION OF THE PREFERRED EMBODIMENTS

Figure 1:
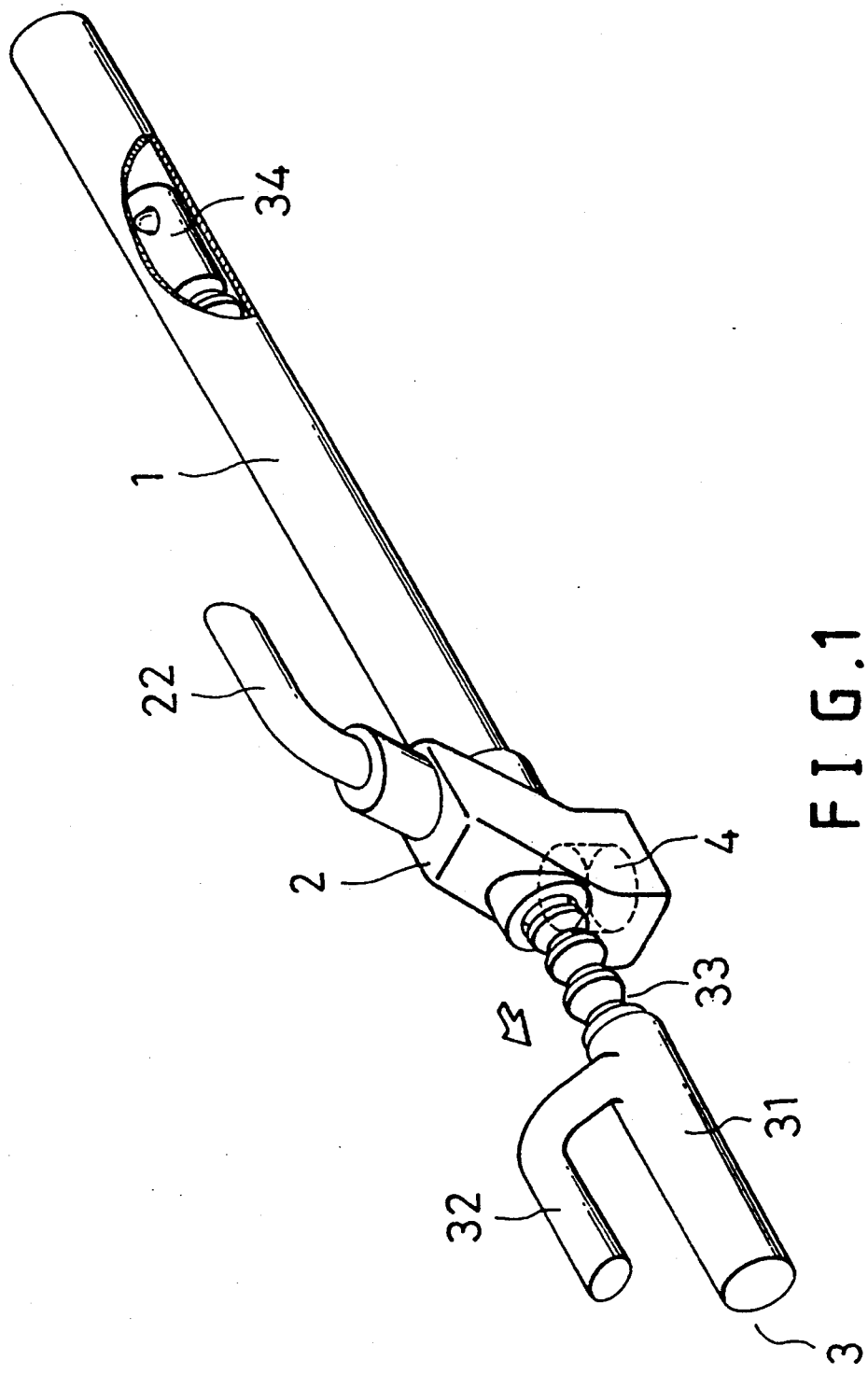
FIG. 1 is an exploded perspective view showing a preferred embodiment of the present invention in assembled condition.

As shown in FIG. 1, the present invention is directed to an automobile steering wheel lock including an elongated tube member 1, a housing 2, an elongated rod member 3 and a lock mechanism 4.

The elongated tube member 1 defining a hollow tube has a central passage 11 extending longitudinally from an open front end to a closed rear end.

The housing 2 is coupled to the front end of the elongated tube member 1, and includes a central passage 21 extending therethrough and being in open communication with the central passage 11 of the elongated tube member 1. The first generally L-shaped member 22 with an annular seat is fixedly secured to the top of the housing 2, by means of welding, to form a hook 22 which opens rearwardly along the elongated tube member 1. A chamber 23 having two opposed holes 24 in the internal wall is formed in the lower portion of the housing 2 for facilitating the insertion of the lock mechanism 4.

Figure 3:
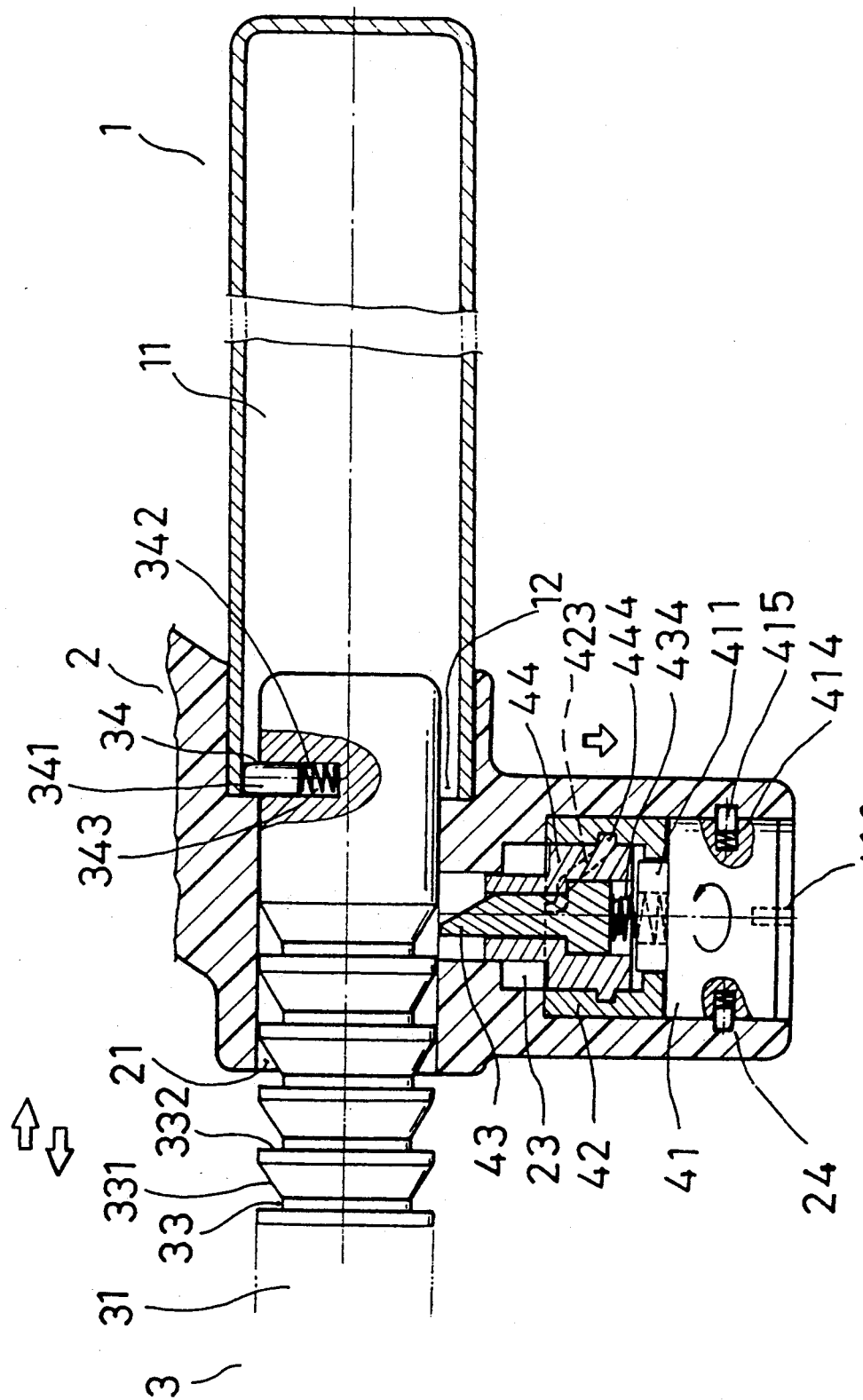
FIG. 3 is a partially cross-sectional view showing a bearing member of the preferred embodiment of the present invention in unlocked condition.

The elongated rod member 3 includes an elongated rod 31, the second generally L-shaped member 32, a plurality of annular grooves 33 and a locating member 34, as shown in FIGS. 1 and 3.

Figure 5:
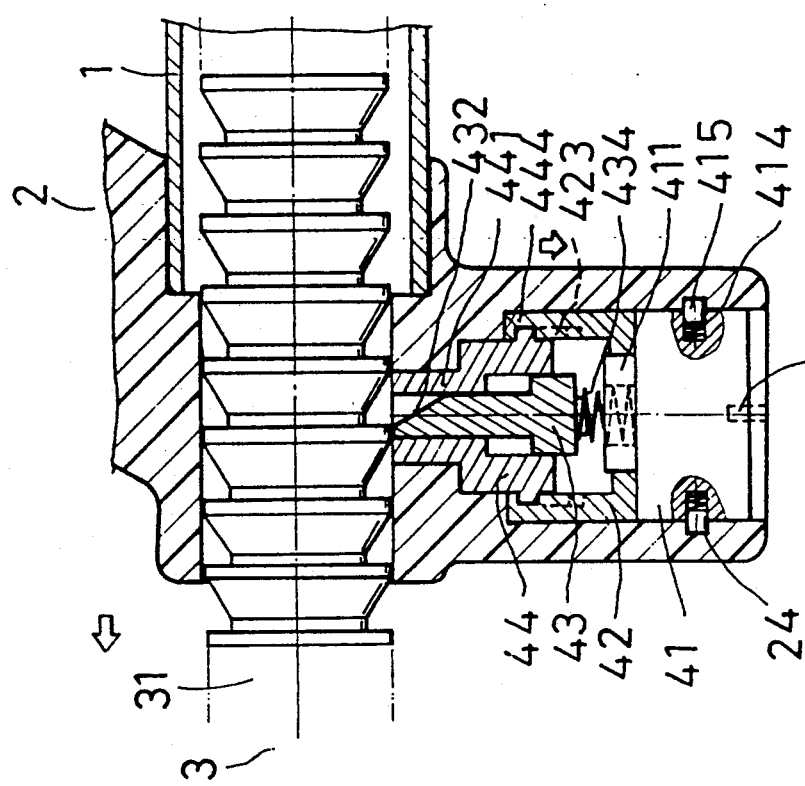
FIG. 5 is a partially cross-sectional view showing the bearing member of the preferred embodiment in drawn-out condition.
Figure 4:
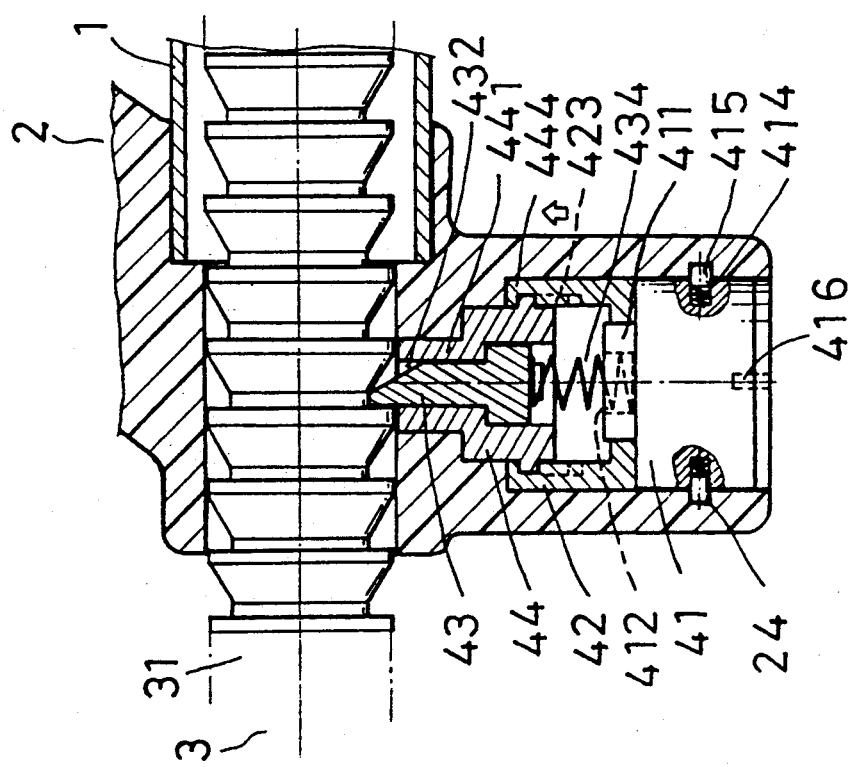
FIG. 4 is a partially cross-sectional view showing the bearing member of the preferred embodiment of the present invention in locked condition.

The elongated rod 31 with circular cross-sectional contour has an outer diameter which is dimensioned to be slightly less than the respective diameters of the central passage 11 in the elongated tube member 1 and the central passage 21 in the housing 2 to enable the elongated rod 31 to telescope freely therein, as shown in FIGS. 3, 4 and 5.

The second generally L-shaped member 32 is fixedly secured to the top of the front portion of the elongated rod 31, by means of welding, to form a hook 32. The hook 32 opens opposite in direction to that of the hook 22, as shown in FIG. 1, for engagement with a diametrically opposed portion of a steering wheel.

The plurality of annular grooves 33 being disposed in parallel spaced relation are axially formed along a major portion of the elongated rod 31. Each of the annular grooves 33 consists of a vertical side wall 332 substantially perpendicular to the longitudinal direction of the elongated rod 31 and relatively close to the hook 32, and a convex or slope side wall 331 relatively far from the hook 32, as shown in FIGS. 1 and 3.

The locating member 34 includes a set pin 341 retained by an end of a spring 342 and is inserted into a pin hole 343 in the rear portion of the elongated rod 31, as shown in FIG. 3.

Figure 2:
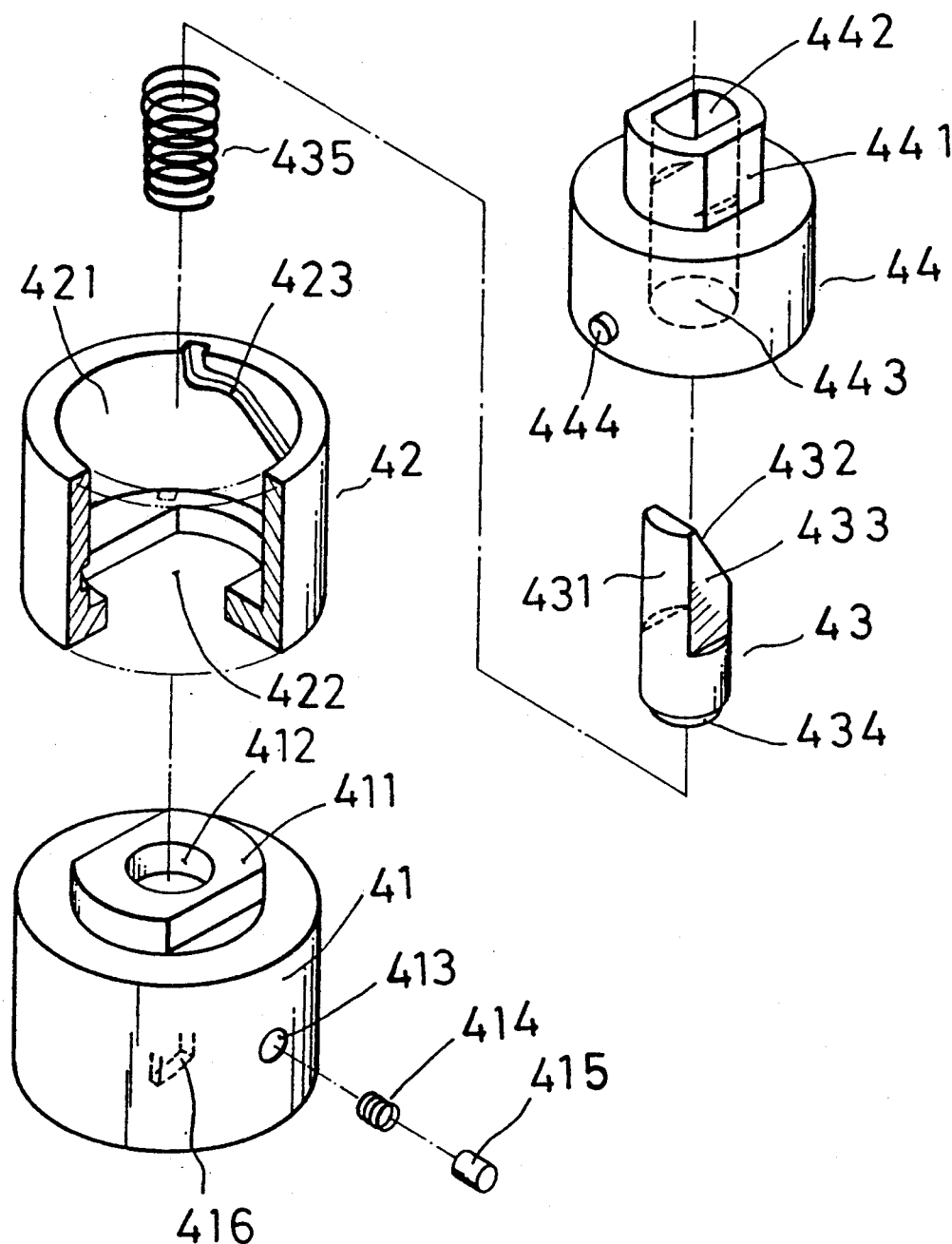
FIG. 2 is a perspective view showing the disassemblage of a lock mechanism of the preferred embodiment of the present invention.

The lock mechanism 4 includes a locking member 41, a sleeve 42, a bearing member 43 and an actuator 44, as shown in FIG. 2.

The locking member 41 defining a solid cylinder has a projection 411 on the top, a key hole 416 in the bottom wall and two opposed recess holes 413 in the external wall. The projection 411 formed with two opposed arcuate edges and two opposed parallel edges has a circular aperture 412 in the center. The two opposed recess holes 413 corresponding to the two opposed holes 24 in the chamber 23 of the housing 2 are capable of being, respectively, inserted by a spring 414 and a stop block 415.

The sleeve 42 defining a hollow cylinder has a circular chamber 421 in the center, an aperture 422 in the bottom wall and a plurality of race ways 423 in the internal wall. The shape of the groove 422 is the same as that of the projection 411.

The bearing member 43 defining a solid cylinder includes a rod-like member 431 on the upper portion and a cylindrically shaped projection 434 integrally formed on the bottom. The cylindrically shaped projection 434 can be retained by an end of a powerful spring 435. The top of the rod-like member 431 is inclined to form an insert end 432. The rod-like member 431 is formed with two opposed parallel side walls and two opposed arcuate side walls.

The actuator 44 with a circular hole 443 in the bottom wall includes a locating projection 441 on the top and a plurality of lugs 444 being disposed on the external wall and corresponding to the plurality of race ways 423 of the sleeve 42. The locating projection 441 has a central hole 442 in open communication with the circular hole 443. The shapes of the locating projection 441 and the central hole 442 are the same as that of the projection 411.

In assembly, as shown in FIGS. 1, 2 and 3, initially the elongated tube member 1 is monoblock-casted with the housing 2 so that the central passage 21 of the housing 2 will be in open communication with the central passage 11 of the elongated tube member 1. A connection 12 is formed in the front joint portion of the central passage 11 of the elongated tube member 1 whose diameter is larger than that of the central passage 21 of the housing 2.

The elongated rod member 3 whose outer diameter is smaller than that of the central passage 21 of the housing 2 is capable of being inserted into the central passages 11 and 21 and telescoping freely within the central passages 11 and 21. Moreover, the locating member 34 of the elongated rod member 3 having the set pin 341 touched the internal upper wall of the central passage 11 under the elastic force of the spring 342 is capable of being stopped before the connection 12 in the front joint portion of the central passage 11 of the elongated tube member 1 whose diameter is larger than that of central passage 21 of the housing 2 so as to prevent the whole elongated rod member 3 from being drawn out of the elongated tube member 1, as shown in FIG. 3.

The assemblage of the lock mechanism 4 is initially to have the aperture 422 of the sleeve 42 mounted by the projection 411 of the locking member 41. The central circular aperture 412 of the projection 411 is capable of being inserted by the lower end of the powerful spring 435 whose upper end has retained the cylindrically shaped projection 434 of the bearing member 43. And then, the actuator 44 is inserted into the circular chamber 421 of the sleeve 42 and the plurality of lugs 444 correspondingly extending into the plurality of race ways 423 of the sleeve 42. The bearing member 43 is capable of passing through the locating hole 442 of the actuator 44 when the plurality of lugs 444 slide downwardly by following the curvy ways of the plurality of race ways 423, by which the actuator 44 is drawn downwardly. Finally, insert two springs 414 and two stop blocks 415, respectively, into the two opposed recess holes 413 of the locking member 41 and the assemblage of the lock mechanism 4 is completed. Insert the whole lock mechanism 4 into the chamber 23 of the housing 2, and the two stop blocks 415 of the locking member 41 will immediately, respectively, extend into the two opposed holes 24 of the chamber 23 and be firmly fixed in the two opposed holes 24 of the chamber 23 under the elastic force of the springs 414, by which the lock mechanism 4 is capable of being firmly inserted in the chamber 23 of the housing 2.

In operation, a user may insert a key into the key hole 416 of the locking member 4 and turn the key hole 416 counterclockwise so that the sleeve 42 of the lock mechanism 4 will be rotated by the actuation of the projection 411 of the locking member 41. The plurality of lugs 444 of the actuator 44 corresponding to the plurality of race ways 423 of the sleeve 42 will slide downwardly by following the curvy ways of the plurality of race ways 423 so as to draw the actuator 44 downwardly. The downward actuator 44 will push the bearing member 43 downwardly so as to withdraw the bearing member 43 from one of the annular grooves 33 of the elogated rod member 3. At the moment, the elongated rod member 3 in unlocked condition is capable of being drawn outwardly or being pushed into the elongated tube member 1 freely. However, the locating member 34 in the rear portion of the elongated rod member 3 has the set pin 341 touched to the internal upper wall of the elongated tube member 1 under the elastic force of the spring 342 and is capable of being stopped before the connection 12 in the front joint portion of the central passage 11 of the elongated tube member 1 to prevent the whole elongated rod member 3 from being drawn out of the elongated tube member 1. Moreover, the locating member 34 will not influence the rotation and the telescopic movements of the elongated rod 31 in the elongated tube member 1.

The plurality of lugs 444 of the actuator 44 will be pushed to the top end of the plurality of race ways when the locking member 41 of the lock mechanism 4 is rotated clockwise by a key. The bearing member 43 will then be pushed upwardly under the elastic force of the powerful spring 435 to protrude into one of the annular grooves 33 of the rod member 3 so as to lock the elongated rod 31 with respect to the elongated tube member 1, at any of a plurality of possible positions, as shown in FIG. 4. The slope side walls 331 of the annular grooves 33 will facilitate the sliding of the bearing member 43 from one annular groove 33 to the next annular groove 33 so that the elongated rod 31 is capable of being drawn outwardly even if the elongated rod member 31 is in locked condition, by which the two opposed hooks 22 and 32 are capable of engaging the inside portion of the steering wheel more tightly. On the contrary, the vertical side walls 332 of the annular grooves 33 will forbid the bearing member 43 to jump back to the previous annular groove 33 so that the elongated rod 31 is incapable of being pushed into the elongated tube member 1 any further without turning a key, by which an automobile is secured against unauthorized use.

While the preferred embodiments of the invention have been described above, it will be recognized and understood that various modifications may be made therein and the appended claims are intended to cover all such modifications which may fall within the spirit and scope of the invention.

What is claimed is:

1. An automobile steering wheel lock comprising:

an elongated tube member defining a hollow tube and having a first central passage extending longitudinally from an open front end to a closed rear end;

a housing being coupled to the front end of said elongated tube member and including a second central passage, a first hook member and a chamber, said second central passage extending transversely through said housing and being in open communication with said first central passage, said first hook member being fixedly secured to the housing and opening rearwardly along said elongated tube member, said chamber formed in a lower portion of said housing for facilitating the insertion of a lock means; and an elongated rod member including an elongated rod, a second hook member, a plurality of annular grooves and a locating member, said elongated rod having circular cross-sectional contour and having an outer diameter slightly less than the respective diameters of said first central passage and said second central passage so as to telescope freely within said first central passage and said second central passage, said second hook member being secured to a front portion of said elongated rod and opening opposite in direction to that of said first hook member, said plurality of annular grooves being disposed in paralled spaced relation and being axially formed along a major portion of said elongated rod, each of said annular grooves consisting of a vertical side wall and a convex or slope side wall, said locating member disposed in a rear portion of said elongated rod;

the improvement of said automobile steering wheel lock being that said lock means inserted in the lower portion of said housing includes:

a. a locking member defining a solid cylinder and having a projection, a key hole and two opposed recess holes in the external wall, said projection being formed with two opposed arcuate edges and two opposed parallel edges and having a circular aperture in the center, said two recess holes corresponding to two opposed holes in the internal wall of said chamber of said housing and being capable of being, respectively, inserted by a spring and a stop block;

b. a sleeve defining a hollow cylinder and having a circular chamber in the center, an aperture at one end and a plurality of race ways in the internal wall, said aperture having the same shape as that of said projection of said locking member and being capable of being mounted by said projection;

c. a bearing member defining a solid cylinder and including a rod-like member and a cylindrically shaped projection said cylindrically shaped projection being capable of being retained by an end of a spring, the top of said rod-like member being inclined to form an insert end, said rod-like member formed with two opposed parallel side walls and two opposed arcuate side walls; and d. a cylindrical actuator having an axially aligned circular hole at one end and a locating projection at the other end and a plurality of lugs disposed on the external wall, said locating projection having a central hole in open communication with said circular hole, said plurality of lugs corresponding to said plurality of race ways of said sleeve;

by the assemblage of said members of said lock means, said bearing member is capable of protruding into or being withdrawn from said elongated rod member under the actuation of a key so as to lock or unlock said automobile steering wheel lock directly.

2. An automobile steering wheel lock as defined in claim 1 wherein said locating member combined by a set pin and a spring is disposed in a pin hole of the rear portion of said elongated rod so as to prevent said elongated rod member from being completely drawn out of said elongated tube member.

* * * * *